United States Patent Office 2,970,053
Patented Jan. 31, 1961

2,970,053

OLEANDOMYCIN RESIN ADSORBATE

Edward G. Martin, East Northport, and Ward J. Haas, Bronxville, N.Y., assignors to Chas. Pfizer & Co., Inc., Brooklyn, N.Y., a corporation of Delaware No Drawing. Filed Oct. 28, 1958, Ser. No. 769,993

3 Claims. (Cl. 99—2)

This invention relates to improved animal feeds as well as to a method for markedly improving the growth of animals, particularly poultry. It is especially concerned with nutritionally balanced animal feed compositions containing a stable oleandomycin resin adsorbate.

In the past, various antibiotics, including oleandomycin, have been reported useful for stimulating the growth of domestic animals, particularly poultry and swine. Oleandomycin is a commercially available antibiotic, the production and properties of which are described and claimed in U.S. Patent 2,757,123 by B. A. Sobin et al.

Although oleandomycin itself is stable in a dry state or when dissolved in anhydrous solvents, aqueous solutions of the compound deteriorate within a relatively short time. This is particularly true of hot acid solutions of the compound. Acid addition salts of oleandomycin such as the hydrochloride, sulfate and phosphate salts, are generally so acidic in their properties that the relatively low pH of their aqueous solutions causes a loss in potency of the acid labile antibiotic. The presence of moisture and metals in animal feeds tend to accelerate the loss of oleandomycin activity in oleandomycin supplemented animal feeds. The use of an oleandomycin resin adsorbate, however, overcomes the loss of oleandomycin activity. The periodic assay of oleandomycin resin adsorbate showed no noticeable loss in potency after six months storage at room temperature.

Moreover, the acid addition salts of oleandomycin are often very bitter and unpleasant to the taste and oleandomycin is relatively unstable in the presence of acids such as those which are present in gastric juice so that its therapeutic efficiency is often reduced when administered orally due to partial decomposition in the stomach.

It has been found that oleandomycin adsorbed on cation exchange resins has unusual stability, particularly under acid conditions and even in the presence of materials normally deleterious to the antibiotic. The formation of various animal feed supplements containing this type of antibiotic product, even with materials normally deleterious to oleandomycin, results in oleandomycin supplemented feeds having greater stability than the heretofore available oleandomycin containing feeds.

Although the adsorption of oleandomycin on ion-exchange resins is suggested as a method of recovery, neither the unusual stability of such oleandomycin resin adsorbates nor their value as animal feed supplements appear to have been recognized prior to this invention.

Animal feeds containing nutritional levels of oleandomycin resin adsorbate elicited a growth increase and feed efficiency response equal to that of feeds supplemented with oleandomycin base or oleandomycin phosphate and substantially greater than the response elicited by penicillin which is considered to be one of the best of the antibiotics for use in poultry.

The comparatively greater activity of oleandomycin resin adsorbate as compared with other antibiotics when used in nutritionally balanced animal feeds is seen when it is noted that a level of oleandomycin resin adsorbate as low as the equivalent of one gram of oleandomycin per ton of feed elicits a response substantially greater than the use of four times that quantity of penicillin. In general, concentrations equivalent to levels of from about 1.0 gram to about 40 grams oleandomycin per ton may be used in animal feeds to obtain the unusually high degree of response in growth production. The use of larger amounts has no particular value in animal growth stimulation. However, if a diseased condition is encountered or anticipated in the animals in question, the level may be substantially increased with subsequent control of the infection if it is due to an oleandomycin-sensitive strain of microorganism. Although some effect may be obtained by use of adsorbate having oleandomycin activity equivalent to less than 1.0 gram per ton of feed, it may be variable, and it is advisable not to use appreciably lesser amounts. The preferred proportion is an amount of oleandomycin resin adsorbate equivalent from about one gram to about five grams of oleandomycin antibiotic per ton of feed.

Thus, a primary object of the present invention is to provide nutritionally balanced animal feeds supplemented with a valuable series of oleandomycin derivatives which afford increased stability levels of this antibiotic as compared to those afforded by oleandomycin base, its acid addition salts or its chloroform adduct. Other objects and advantages of the present invention will be apparent during the course of the following description.

In accordance with the present invention it has been discovered that oleandomycin resin adsorbates, wherein the oleandomycin is adsorbed on strong acid cation-exchange resins such as cation-exchange resins containing sulfonic acid groups, exhibit unusual stability. These cation-exchange resins include such materials as the Dowex–50 resins (available from the Dow Chemical Company) which are sulfonated polystyrene compounds cross-linked with a divinyl aromatic compound such as divinylbenzene and described in U.S. Patents 2,191,853; 2,366,007; 2,518,420; and in BIOS 621, No. 22 (1446); the Amberlites such as Amberlite IR–120, and Amberlite XE–176 (available from the Rohm and Haas Company) which are sulfonated polystyrene compounds cross-linked with 8% and 1% divinylbenzene respectively. In general, resins possessing a high degree of porosity are favored because of the relatively large size of the oleandomycin molecule. Such resins (i.e., Dowex 50–X1, Dowex 50–X2) contain a low degree of cross-linkage (1% and 2% respectively) with a copolymerizing agent such as divinylbenzene and are characterized by a relatively rapid rate of adsorption and/or elution of the given antibiotic. Moreover, since the mesh size of the resin particles affects the rate of adsorption and elution, the resin should preferably be from about 50 to 400 mesh U.S. sieve series if rapid release is desired. Resins in this mesh range combine suitable features of adsorption in the batch and column processes and elution in the gastro-intestinal tract.

Moreover, the oleandomycin resin adsorbates retain their high stability even when incorporated into animal feeds and are particularly valuable in the formation of nutritionally balanced animal feeds containing a stable and high level of oleandomycin activity.

The products of the present invention have certain advantages when administered to animals in that the antibiotic adsorbed on the resin is appreciably protected from the acid gastric juices and passes practically unchanged through the gastric system into the intestinal tract which, having a higher pH, is effective in removing the antibiotic from adsorption on the resin, facilitating adsorption into the system. Oral ingestion of the adsorbate has been found to produce urine levels of oleandomycin equivalent to those obtained with an equivalent amount of oleandomycin phosphate salt. In particular, it has been found that the advantages possessed by these adsorbates of oleandomycin on the sulfonic acid type of strong acid cation-exchange resin are manifold; they are stable, insoluble compounds having greater stability, particularly in the presence of acid media, than the oleandomycin base per se, its acid salts or chloroform adduct; and they are relatively non-toxic and tasteless, give urine levels equivalent to that of an equivalent amount of the phosphate salt and contain a highly purified form of oleandomycin since oleandomycin which has been purified by the usual methods will be purified to an even greater extent by adsorption on a cationic ion exchange resin since some residual impurities will not be adsorbed on the resin. Hence, the herein described oleandomycin resin adsorbate products of this invention are especially valuable as animal feed supplements in view of the surprising and unexpected stability which they possess; and in addition to fulfilling the aforementioned objects of this invention, they also exhibit utility against a wide variety of microorganisms including Gram-positive and Gram-negative organisms and various pathogenic organisms and may be used in animal feeds in conjunction with other antibiotic or therapeutic agents such as penicillin, oxytetracycline, chlortetracycline, tetracycline, bacitracin, phenylarsonic acid, sulfaquinoxaline, etc. If desired, a second antibiotic such as oxytetracycline may be simultaneously adsorbed with oleandomycin on a resin to produce an adsorbate possessing the combined effects, to an equal or greater degree, of both antibiotics.

The herein described feeds of this invention have been found to be particularly valuable and outstanding in the case of non-ruminant animals, such as chickens, turkeys, ducks, hogs, and the like. Other animals, such as cattle, sheep and goats, are also benefited by the use of nutritionally balanced animal feed compositions containing oleandomycin resin adsorbate. The oleandomycin may, of course, be administered in one component of the feed or it may be blended uniformly throughout a mixed feed. A variety of feed components may be of use in the nutritional diets. A type of conventional feed material in the case of poultry, which is often preferred in the operation of this invention, is one which follows generally the suggested formulae set forth on page six of the authoritative pamphlet issued by the National Research Council (Washington, D.C., June 1944) and entitled "Recommended Nutrient Allowances for Poultry." For instance, feed compositions are recommended to contain roughly between 50% and 80% of grains, between 3% and 10% of animal protein, between 5% and 30% of vegetable protein, between 2% and 4% of minerals, together with supplementary vitaminaceous sources.

In accordance with the process of this invention, oleandomycin in various forms, such as Streptomyces fermentation broths, or partially purified concentrates of the antibiotic, the free base, or preferably a pure acid addition salt of the oleandomycin base, for example, the hydrochloride, the sulfate, the nitrate, the acetate, etc., are contacted in the form of aqueous solutions with a strong acid cation-exchange resin of a suitable low toxicity at an acid to moderately alkaline pH. In general, contact is made at pH values ranging from 2 to 8. The concentrates of oleandomycin used for the manufacture of the present products may have activity ranging from about 10,000 micrograms per milliliter up to the potency of the pure crystalline compound, that is (1,000,000 micrograms per gram for oleandomycin itself).

In operating the process for the preparation of the products of this invention, the chosen resin is contacted with the aqueous oleandomycin containing solution at about 20° C., that is, from about 10° C. to 60° C. utilizing sufficient resin to adsorb a major part of the antibiotic. Under optimum conditions an adsorbate containing as high as 0.76 gram of antibiotic activity per gram of resin adsorbate can be prepared. However, this depends upon the purity of the oleandomycin product used, the concentration of the solution, temperature, pH, the nature of the resin and other factors.

In the adsorption of oleandomycin upon ion-exchange resins, the presence of inactive materials in the aqueous solution may materially affect the proportion of antibiotic adsorbed. This is particularly true when water-soluble inorganic salts are present. This tends to appreciably decrease the proportion of antibiotic adsorbed on the resin.

The adsorbates may be prepared by either a batch or column process. In the former, the oleandomycin-containing aqueous solution is slurried with the chosen resin and the whole stirred for a suitable period of time depending upon the characteristics of the resin employed. In the column process, an aqueous solution of oleandomycin or its acid salts is percolated through a column of the resin, generally until the concentration of the eluate corresponds to that of the antibiotic solution being treated. Although this procedure generally produces a higher potency product the batch process is preferred from a practical standpoint.

In accordance with a preferred embodiment of this invention, a dry, stable oleandomycin resin adsorbate was prepared by dissolving 40.0 grams of oleandomycin phosphate salt in 400 ml. of water. To this solution was added with good agitation 40 grams of dry Dowex 50–X2 (200–400 mesh) in the sodium cycle. After two hours' agitation at room temperature, the adsorbate was filtered, washed, repulped in one liter of water and dried at 35° C. in a suitable vacuum oven. The adsorption yield, based on biological assays was 90% corresponding to a product containing 400 mg. of oleandomycin per gram of dry adsorbate. The addition of oleandomycin resin adsorbate to poultry feed at levels of 2.5 to 12.5 grams per ton, equivalent to one to five grams oleandomycin per ton, afforded growth and feed efficiency responses that were two to three times the magnitude obtained with procaine penicillin.

This invention is further illustrated by the following examples, which are not to be considered as imposing any limitation on the scope thereof.

EXAMPLE I

Amberlite XE–176 ion-exchange resin in the sodium cycle was washed with water, dried at 100° C. and ground to a fine powder. Material passing through a 200 mesh screen was separated for use. 40 gallons of water extract containing oleandomycin phosphate equivalent to a potency of 10,000 γ/ml. of oleandomycin base was prepared. To the aqueous solution was added 1745 grams of the powdered resin. The mixture was stirred for 2 hours and the resin filtered and washed. The resin cake was repulped in 10 gallons of water, refiltered, washed and dried at 35–50° C. in a vacuum oven. The dried resin adsorbate was found to have an activity equivalent to 400 mg. of oleandomycin base per gram of dry resin adsorbate.

Stability studies on animal feeds containing this resin adsorbate were conducted over a period of several weeks and compared with stability data of several other forms of oleandomycin obtained under identical conditions. For convenience, the oleandomycin salts were premixed with Supercel as diluent then added to the animal feed in amounts ranging from about 400 to about 650 mg. of oleandomycin per gram of feed. These relatively high concentrations were utilized to facilitate assay of the samples. Samples were stored at various temperatures and assayed periodically of their biopotency. The following results were obtained:

*Stability results; Bioassay*

[Mg./g.]

| Oleandomycin Salt | Initial Assay | 3 Weeks, 50° | 6 Weeks | |
|---|---|---|---|---|
| | | | 25° | 50° |
| Lauryl sulfate | 0.456 | 0.182 | 0.369 | |
| Methylene disalicylate | 0.387 | 0.054 | 0.393 | |
| Chloroform | 0.387 | 0.033 | 0.193 | |
| Trichloroethane | 0.537 | 0.037 | 0.272 | |
| Tannate | 0.483 | 0.224 | 0.394 | |
| Resin Adsorbate | 0.655 | 0.592 | 0.522 | 0.362 |

In each instance, the chemical assay agreed with the biological assay within the experimental limits.

The exceptional stability of the composition of this invention is borne out by this data. The resin adsorbate even after 6 weeks at 50° C. retained greater than 55% of its potency whereas compositions of the other salts lost more then 60% of their potency within 3 weeks.

Growth experiments utilizing this product were conducted on Nichols white-cross chicks kept in electrically heated brooders on raised wire floors. The day old chicks were divided into lots of five males and five females per compartment, replicated twice per treatment. The basal diet employed is shown below in the following table:

Ingredients:                                  Diet (lbs.)
    Ground yellow corn _____ 56.44
    44% solvated soybean meal _____ 26.94
    Corn gluten meal _____ 2.50
    Alfalfa meal _____ 2.00
    Stabilized animal fat _____ 1.50
    Fish meal _____ 4.00
    Dried corn distillers solubles _____ 1.00
    Dried whey (50% delactosed) _____ 1.00
    Dried brewer's yeast _____ 1.50
    Iodized salt _____ 0.40
    Calcium carbonate _____ 1.30
    Calcium phosphate, dibasic _____ 1.00
    Delamix _____ 0.10
    DL-methionine _____ 0.01
    Vitamin A (10,000 I.U./g.) _____ 0.05
    Vitamin $B_{12}$ _____ 0.020
    Vitamin $D_3$ (1,500 I.C.U./g.) _____ 0.05
    Riboflavin _____ 0.05
    DL-calcium pantothenate _____ 0.001
    Niacin _____ 0.001
    Choline chloride 25% _____ 0.125
    N,N'-diphenyl-phenylenediamine _____ 0.0125
                                            100

The antibiotic test materials were added to the diet in premix form at the expense of yellow corn meal. Birds were individually weighed and records of feed consumption by lot were maintained. Four week chick weights were subjected to statistical analysis for significance by the method of analytical variance. The inclusion of oleandomycin resin adsorbate in the nutritionally balanced basal diet was found to produce substantial improvements in growth and feed efficiency over that of the negative control group and the procaine penicillin supplemented group.

When New Hampshire Red chicks were treated in a similar manner, the results obtained were substantially the same.

EXAMPLE II

The same procedure as described in Example I was followed here except that 8 gallons of water extract containing oleandomycin phosphate equivalent to a potency of 50,000 $\gamma$/ml. of oleandomycin was used. The dried resin adsorbate was found to have an activity equivalent to 400 mg. of oleandomycin base per gram of dry adsorbate.

The inclusion of this resin adsorbate into the nutritionally balanced basal diet of Example I at the rate of 2.5 or 5.0 grams per ton, equivalent to 1 and 2 grams of oleandomycin base respectively, produced substantially the same results, whereas procaine penicillin produced only a small growth response.

Stability studies conducted in the manner described in Example I but utilizing oleandomycin salts premixed with limestone gave the following results:

*Stability results; bioassay*

[Mg./g.]

| Oleandomycin Salt | Initial Assay | 3 Weeks, 50° | 6 Weeks | |
|---|---|---|---|---|
| | | | 25° | 50° |
| Lauryl sulfate | 0.415 | 0.140 | 0.352 | |
| Methylenedisalicylate | 0.435 | 0.045 | 0.347 | |
| Tannate | 0.509 | 0.252 | | |
| Resin Adsorbate | 0.612 | 0.580 | 0.544 | 0.384 |

In each preparation, the chemical assay agreed well with the biological assay. In the 3 week studies at 50° C. the potency of the compositions of this invention remained within 94% of the original value whereas the other samples lost at least 50% of their potency. Even after 6 weeks at 50° C. this composition exhibited considerably greater stability than the other samples did on the short term studies.

EXAMPLE III

The same procedure as described in Example I was followed here except that the concentration levels of oleandomycin resin adsorbate in the nutritionally balanced basal diet were raised to 12.5, 62.5 and 100.0 grams per ton, equivalent to 5, 25 and 40 grams oleandomycin base respectively. The higher level (62.5 and 100.0 grams per ton) of resin adsorbate did not produce an improvement over results obtained with 12.5 grams per ton.

EXAMPLE IV 10 kg. of dry Dowex 50-X2 (200-400 mesh) in the sodium cycle was added with good agitation to a solution prepared by dissolving 10 kg. of oleandomycin phosphate salt in 25 gallons of water. After two hours agitation at 25° C., the adsorbate was filtered, washed, repulped in 50 gallons of water and dried at 35° C. in a vacuum oven. Based on biological assays, an adsorption yield of 90% was obtained to yield a product containing 400 mg. of oleandomycin base per gram of dry adsorbate.

Growth experiments identical to those of Example I produced substantially the same results. Equal levels of oleandomycin resin adsorbate produced growth responses substantially greater than those obtained with procaine penicillin. The superiority of the growth with oleandomycin resin adsorbate over that with procaine penicillin was statistically significant.

EXAMPLE V

The same procedure as described in Example IV was followed here except that 16 kg. of dry Dowex 50-X1 (200-400 mesh) was used. Based on biological assays, the product contained 250 mg. of oleandomycin base per gram of dry adsorbate.

Stability studies conducted according to the procedure of Example I gave the following results when using Supercel premixes.

*Stability results; bioassay*

[Mg./g.]

| Oleandomycin Salt | Initial Assay | 3 Weeks, 50° | 6 Weeks | |
|---|---|---|---|---|
| | | | 25° | 50° |
| Lauryl sulfate | 0.456 | 0.182 | 0.369 | |
| Methylenedisalicylate | 0.470 | 0.054 | 0.393 | |
| Tannate | 0.483 | 0.224 | 0.394 | |
| Chloroform | 0.387 | 0.033 | 0 193 | |
| Trichloroethane | 0.537 | 0.037 | 0.272 | |
| Resin Adsorbate | 0.465 | 0.478 | 0.489 | 0.425 |

The superior stability of this resin adsorbate is adequately demonstrated. Little or no loss of potency occurred after 3 weeks at 50° C. and 90% potency remained after 6 weeks at 50° C.

EXAMPLE VI

When oleandomycin hydrochloride was used in place of oleandomycin phosphate in each of the aforesaid examples the results obtained were substantially the same.

EXAMPLE VII

A resin adsorbate prepared according to the procedure of Example I was prepared substituting the acid form of Amberlite XE-176 for the sodium form of the resin. The stability of this adsorbate and its growth and feed efficiency were substantially the same as the resin of Example I.

EXAMPLE VIII

A resin adsorbate prepared according to the procedure of Example IV but using 50 g. of dry Dowex 50-X4 (100-200 mesh) in the sodium cycle and 50 g. of oleandomycin phosphate salt in 1.5 gallons of water had a potency of 350 mg./gm. and gave substantially the same results as the adsorbate of Example IV when used at equivalent concentrations.

EXAMPLE IX

Growth experiments were conducted on baby pigs utilizing the basal diet shown below:

Ingredients:
Finely ground yellow corn _____lbs__ 51.5
Soybean oil meal (about 50%) _____lbs__ 15.0
Dried skim milk _____lbs__ 20.0
Strained bone meal _____lbs__ 1.0
Limestone _____lbs__ 0.5
Salt (iodized) _____lbs__ 0.5
Stabilized animal fat _____lbs__ 4.0
Sucrose _____lbs__ 6.0
Vitamin mix F _____lbs__ 1.0
Mineral mix F _____lbs__ 0.5
Saccharin _____gms__ 22.7

The inclusion of the oleandomycin resin adsorbate of Example I in this nutritionally balanced diet at the expense of the yellow corn, at rates equivalent to 1 and 2 grams of oleandomycin base per ton, produced substantial improvements in growth and feed efficiency over that of negative control groups and a procaine penicillin supplemented group.

Erythromycin supplemented aminal feeds analogous to the stable oleandomycin supplemented feeds disclosed and exemplified herein are prepared by substitution of erythromycin resin adsorbate for the oleandomycin resin adsorbate. The biopotency of the erythromycin resin adsorbates depends upon the purity and concentrations of the erythromycin product used, the temperature, pH, nature of the resin and other factors.

What is claimed is:

1. An animal feed composition comprising a nutritionally balanced animal feed together with an oleandomycin resin adsorbate wherein the oleandomycin is present as an adsorbate on a porous sulfonic acid type cation exchange resin of low toxicity.

2. A feed composition as claimed in claim 1 wherein the oleandomycin resin adsorbate is present at a concentration level equivalent to from about 1.0 gram to 40 grams oleandomycin base per ton of feed.

3. A process for increasing growth and improving feed efficiency in animals, which comprises administering thereto in a component of a nutritionally balanced feed composition a small proportion of an oleandomycin resin adsorbate wherein the oleandomycin is present as an adsorbate on a porous sulfonic acid type cation exchange resin of low toxicity.

References Cited in the file of this patent

UNITED STATES PATENTS

| 2,739,063 | Wehrmeister | Mar. 20, 1956 |
| 2,757,123 | Sobin | July 31, 1956 |
| 2,828,207 | Fullhart | Mar. 25, 1958 |